United States Patent
Hall et al.

(10) Patent No.: US 12,164,938 B2
(45) Date of Patent: Dec. 10, 2024

(54) DYNAMIC INPUT INTERACTION

(71) Applicant: INSPACE PROXIMITY, INC.

(72) Inventors: Narine Manukyan Hall, Colchester, VT (US); Haykanush Lputyan, Yerevan (AM)

(73) Assignee: INSPACE PROXIMITY, INC., Colchester, VT (US)

( * ) Notice: Subject to any disclaimer, the term of this patent is extended or adjusted under 35 U.S.C. 154(b) by 0 days.

(21) Appl. No.: 18/209,423

(22) Filed: Jun. 13, 2023

(65) Prior Publication Data

US 2023/0401076 A1     Dec. 14, 2023

Related U.S. Application Data

(60) Provisional application No. 63/351,625, filed on Jun. 13, 2022.

(51) Int. Cl.
*G06F 9/451*     (2018.01)
*H04L 12/18*     (2006.01)
*H04L 65/403*    (2022.01)

(52) U.S. Cl.
CPC .............. *G06F 9/451* (2018.02); *H04L 12/18* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 5,966,114 A | * | 10/1999 | Ito | G06F 3/0481 345/635 |
| 11,539,918 B1 | * | 12/2022 | Libin | H04L 12/1827 |
| 11,647,060 B1 | * | 5/2023 | Mese | G06F 40/205 715/756 |
| 2008/0003559 A1 | * | 1/2008 | Toyama | G09B 7/02 434/350 |
| 2013/0091205 A1 | * | 4/2013 | Kotler | H04L 67/54 709/204 |
| 2014/0012635 A1 | * | 1/2014 | Joyce | G07C 13/00 705/12 |
| 2016/0139665 A1 | * | 5/2016 | Lopez | G06F 3/013 345/156 |
| 2018/0011627 A1 | * | 1/2018 | Siracusano, Jr. | H04L 65/80 |
| 2020/0349593 A1 | * | 11/2020 | Whiting | G06Q 30/0203 |
| 2022/0300598 A1 | * | 9/2022 | Ford | G06F 21/31 |

* cited by examiner

*Primary Examiner* — Matthew Ell
*Assistant Examiner* — Gabriel Mercado
(74) *Attorney, Agent, or Firm* — ARLUYS IP, P.C.

(57) ABSTRACT

Techniques are described for dynamic input interaction. In an embodiment, a media stream originating from client computer system(s) in a media session is received. Using a portion of the media stream, the process requests generating an interactive input request related to the portion. Based on the generated interactive input request, UI elements that represent the interactive input request are generated on the user interface(s) of the media session on the client computer system(s). Based on the location information of the participant UI element associated with a user, the process determines the user input data of the user for the interactive input request.

18 Claims, 6 Drawing Sheets

DYNAMIC INPUT INTERACTION

RELATED APPLICATIONS

This application claims the benefit under 35 U.S.C. § 119(e) of provisional application 63/351,625, filed Jun. 13, 2022, the entire contents of which are hereby incorporated by reference for all purposes as if fully set forth herein.

This application is also related to application Ser. No. 17/366,049, entitled "Dynamic Multi-User Media Streaming," filed on Jul. 2, 2021, the entire contents of which are hereby incorporated by reference.

FIELD OF THE TECHNOLOGY

The present invention relates to the field of electronic media streaming technologies, in particular to dynamic input collection.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Media streaming solutions for video conferencing lack interactive features to provide users with the ability to dynamically change the user experience of media-based interaction while maintaining the same session. When users connect to a video conferencing solution and establish a video/audio-sharing session, the multimedia experience is generally limited to broadcast.

Even if any interaction occurs within the session, such an interaction is very limited and/or requires an additional interface/tool panel. For example, causing the "raising hand" icon to appear may be broadcasted to all participants to request attention without audio communication. As another example, a whiteboard may be requested for a shared workspace, in which user(s) have to select from a drawing panel tool and use the mouse input to generate drawings for sharing with others. Although the whiteboard may replicate the physical experience of having a physical board to share information with others through live drawing, the tools are cumbersome to use and have only a visual display purpose limited to viewing the drawings.

Accordingly, the current solutions lack the dynamism of interaction and are inadequate to collect structured inputs such as for polling or answers to posted questions.

BRIEF DESCRIPTION OF THE DRAWINGS

In the drawings of certain embodiments in which like reference numerals refer to corresponding parts throughout the figures.

DETAILED DESCRIPTION

Figure 1:
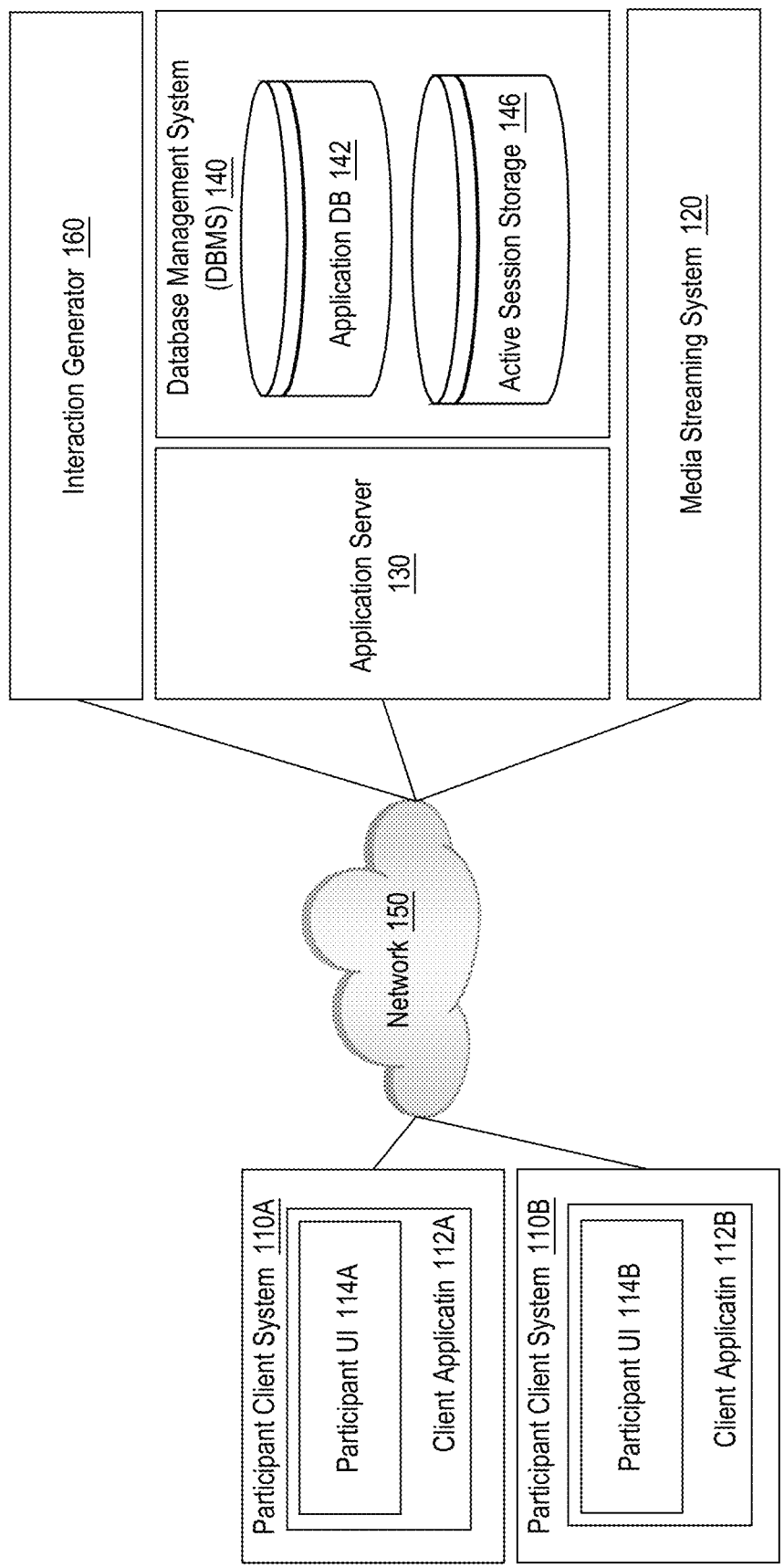
FIG. 1 is a block diagram that depicts a dynamic multi-user media streaming system (DMMSS) 100, in one or more embodiments.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe techniques for dynamic user interaction on a user interface (UI). In an embodiment, a user of a client system initiates a media sharing session, such as an audio/video conferencing session, using a dynamic multi-user media streaming system (DMMSS). The DMMSS may avail the session for other users of other client systems to participate in the same media session. A client system connected to such a media session sends to and receives media stream(s) from other client computer systems connected to the same media session. The media stream(s) may include a video track, audio track, textual data (e.g., shared documents), and image(s).

In addition to streaming multimedia, DMMSS may share data track(s) with metadata of the media session among the client computer systems participating in the media session and/or application server. The data track may be used to control the sharing of the media stream for participant client systems in the media session and/or to process the metadata information by the application server. Based on the received metadata through the data track, the sending participant client system(s), the receiving participant client system(s), and/or the application server of the DMMSS may determine which media stream(s), what amount of the media stream(s) to reproduce (size, resolution, quality, signal strength/level, etc.), and/or what additional media to reproduce (interaction requests, background media, helper tools like a whiteboard, etc.).

In an embodiment, the metadata of a media session is generated by a local client system by receiving an input request at the system to interact with the displayed UI representing the media session. The interaction request may indicate a request to move a participant UI control representing the local user on the UI of the local system to another position within the UI. The metadata indicating the move is generated (e.g., as event data, including coordinates for the move) and sent to the remote client system(s) of the media session via the data track.

In an embodiment, the media session may cause a display of one or more interaction request and/or probing UI elements. The metadata may record the movement and/or the (final) position of the participant UI control in relation to one or more probing UI elements. The receipt of the input of the movement of a participant UI control in relation to one or more probing UI elements may be the requested input of the user of the participant UI control to the request described by one or more interaction request and/or probing UI elements.

In an embodiment, the request for input may be automatically generated by the DMMSS. The DMMSS may receive input context data from the media session and, based on the context data, generate an input request for the media session. The DMMSS may execute a machine learning model trained based on historic or synthetic context data and known input requests generated for the input context data. The input context data may be generated from the media stream of the media session and/or by one or more participant client systems receiving input from the corresponding participant users.

For example, the media session may provide a polling question for users of the media session to answer. The polling question may be displayed on a participant client system as an interaction request UI element with answer choices as the probing UI elements to collect the polling input. The user may respond to the question by requesting the participant client system to move the participant UI control of the user towards (and/or cover) the probing UI element of the answer choice selected by the user. The participant client system receives the request and displays the move of the participant UI control towards the selected answer's probing UI element (or visual coverage thereof). The metadata generated by the movement is sent by the participant client system to other participant client system(s) and/or an application server of the media session. The other participant client system(s) display the movement in the media session based on the received metadata.

The determination of the participant UI control's position in relation to a static UI object may represent the user's dynamic input for the interaction request in a media session. The proximity may be determined by the coordinates of the new location of the participant UI control in relation to the coordinates of the probing UI element(s). The proximity is the closest (has the highest value) when the participant UI control completely overlaps with the probing UI element. Since the participant UI control's coordinates may change at any time based on the request by the user to the participant client system, the input by the user may dynamically change. As the participant UI control moves across the UI, the proximity(es) with the probing UI elements change, as calculated by the DMMSS.

In an embodiment, to calculate the proximities and generate the dynamic input results, the DMMSS may retrieve the participant UI control coordinates and/or the probing UI element's coordinates from the metadata continuously (per threshold movement distance), at intervals and/or per user request received from a participant client system. At such point, the calculated proximity(es) (e.g., distance or inverse of distance) correspond to the dynamic input of the user(s) replying to the input request in the media session. The dynamic input may be based on multiple proximities of the participant UI control with the corresponding multiple probing UI elements.

Continuing with the example of the question polling having answer choices for which an answer is requested in the media session, the application server receives the coordinates for the participant UI control(s) and the probing UI element(s) of the corresponding answer choice(s) or the respective calculated distance(s) themselves. Based on this information, determines for each of the participant UI controls the most proximate (distance-wise) probing UI element of the answer choice. The most proximate answer choice to the participant UI control is the answer input for the question polling by the user of the participant UI control.

Additionally or alternatively, the proximity of a particular participant UI control of a user to a particular probing UI element of a particular answer choice represents the numeric confidence level input of the user for the particular answer choice. Such proximity of the particular participant UI control with the probing UI element of the particular answer choice as compared with other distances to other probing UI elements of other answer choices may be the numeric input representing the relative confidence level of the user for the particular answer choice.

Accordingly, by causing the movement of the participant UI controls within the media session, the user provides the answer(s) to the polling question in numeric or selection format. The DMMSS may determine the results of the interaction request based on determining the proximities (distances) of the participant UI control to any one or more (up to all) of the probing UI elements of the answer choices.

In an embodiment, the DMMSS determines the results of the interaction input request based on the dynamic input collected. The results may be displayed on the participant client systems of the users of the media sessions.

Continuing with the example of the polling question, each answer choice may receive an accumulative number of votes or numeric representation of accumulated confidences that are based on the proximity(ies) of the participant UI controls to the answer's probing UI elements on the UI. The results may be transmitted to the participant client systems as part of generated metadata of media stream(s) of the media session to display.

Media Streaming of Media Session

The proximity of participant UI control(s) may also determine the reproduction of the media stream(s) at the corresponding participant client system. The remote (to a particular client system) client system of the media session, upon the receipt of the metadata from the participant client system, may calculate the change in proximity of the remote participant UI control of the remote user with the local participant UI control of the local user. Based on the change in the proximity, the reproduction of the media stream from the local client computer system on the remote client system may change analogous to the modification of the media stream on the local client system.

Conversely, when the remote client computer system receives a request that indicates a request to move a participant UI control representing the remote user on the remote UI to another position within the UI, the metadata indicating the move is generated on the remote client system. The metadata from the remote client system is sent to the local participant system to update the local UI and to adjust the playback of the media stream(s) from the remote system. The local system, upon the receipt of the metadata, may calculate the new proximity of the remote participant UI control of the remote user with the local participant UI control of the local user and update the UI accordingly. Based on the change in the proximity, the reproduction of the media stream(s) from the remote system may change in the local client system.

For example, as the remote participant UI control is moved further away from the local participant UI control, the audio track of the media stream from the remote client system decreases in volume level on the local computer system. The amount of the decrease in the volume may be calculated to be based on the amount of change in the proximity. Conversely, when the remote participant UI control is moved closer to the local participant UI control, the audio track of the media stream from the remote client system may be increased on the local client system.

In one or more embodiments, the modification to the media streams from the remote client system may include one or more of: discarding the media stream completely; discarding any video/audio track thereof; adjusting playback of the media stream such as modifying the sound level of an audio track; downgrading (downsampling) video/image track; and/or replacing a video track (or a playback thereof) with an image. Any of the modifications may be performed on the application server of DMMSS to which the client systems are connected for the media session, on the originating participant client system, and/or on the recipient participant client system.

In an embodiment, a media session by the DMMSS is divided into zone streams. The term "zone streams" refers to media stream(s) of user(s), which form a group based on the locations of their respective participant UI controls in the UI(s) of the media session. The term "UI zone" refers to a portion of the UI of a media session that is delineated for forming such a group. The client systems of participant UI controls that are within the UI zone receive each other's media streaming (sound and active engagement) but may not receive, may only partially receive, may receive but not reproduce, or may receive but only partially reproduce the media streaming from client system(s) which respective participant UI controls are outside the UI zone. Accordingly, the client system of the UI zone may discard (e.g., fails to receive or fail to reproduce) media streams from the participant client system(s), which corresponding participant UI controls are outside of the UI zone.

In an embodiment, in which the client system receives non-zone media streams from client systems but fails or only partially reproduces the media streams, no change to the communication with such client system(s) are made. The media streams may be simply discarded/ignored/modified from the client system(s) by failing to send, failing to reproduce, and/or partially reproducing them on the recipient client system without any change to the communication with the client(s).

In an embodiment, a local client system receives an interaction request to move a local participant UI control from outside of a UI zone into the UI zone on the local UI of a media session. The local client system determines the new position of the local participant UI control. If the new position has moved within a UI zone that includes another remote participant UI control of a remote client system, then the local client system sends its media stream of the media session to the remote client system and/or playbacks the media stream received from the remote client system. However, if the remote participant UI control is outside of the UI zone while the local participant UI control is within the UI zone, the media stream from the remote client system of the UI zone is at least in part discarded. For example, the audio track from the remote client system may be muted on the local client system (or blocked by the application server of DMMSS or the remote client system itself). When the remote participant UI control moves back inside the UI zone, the media streaming of the media session between the local and the remote client systems is re-established.

Accordingly, within a media session, one or more private sessions of media streams may be created amongst the participant users using UI zones. To broadcast to all participants of the media session in such an embodiment, a local client system may receive an interaction request from the local participant user to share at least a portion of its media stream with all participants (e.g., a request to broadcast the media stream). When such a request is received (and in some cases, approved), at least a portion of the media stream of the local participant is sent and caused to playback on all participant client systems of the media session, regardless of their respective participant UI control positions on the UI (even if the participant UI control is within a UI zone).

In an embodiment, a remote client system receives a request to share one or more video streams with one or more other participant client systems in a media session with the remote system. Once shared, the video stream may be received by the other participant client systems in the media session (regardless of the proximity or UI zones). On the local UI of a local client system, the shared video streams may be displayed at the location of the corresponding remote participant UI control or within the UI zone in which the remote participant UI control is located. Due to proximity or different UI zones, the local client system may not receive and/or playback the non-video tracks (e.g., audio track) of the remote system while still displaying at least a portion of the video stream from the remote system (e.g., full, downsampled, or a thumbnail image).

The DMMSS may further provide a screen share video stream that allows multiple participant client systems to share their display screen stream in the same session to be displayed on participant UI's of the participant client systems. The shared screen may be displayed on a UI of the media session in any shape and may be controlled by the originating participant client system.

The participant client systems in the media session may receive and display each video stream or a subset thereof. The selection of which subset to view may be performed by the participant's client system's zoom in/zoom out interaction input request on the respective UI. The zoom in/out requests of the local UI may perform a zoom function for the background and/or for individual participant UI controls (which may be streaming the respective video/image stream).

System Overview

FIG. 1 is a block diagram that depicts a dynamic multi-user media streaming system (DMMSS) 100, in one or more embodiments. DMMSS 100 includes application server 130, which is connected to database management system (DBMS) 140 that hosts application database 142 and active session storage 146. Application server 130 services requests from participant client systems, such as participant client systems 110A and 110B. Application server 130 transmits to participant client systems the non-streamable UI elements for participant UI's 114A/B of a sharing session (e.g., background, participant UI controls, UI frames around participant UI controls, and others). Application server 130 may generate and transmit the non-streamable UI elements to the participant client system to display in participant UI's 114A/B based on the data stored in application database 142 of DBMS 140.

In an embodiment, participant UI's 114A/B may be customized with background images for at least a portion of the UI space, for example setting the background to be a campus building or any other picture.

In an embodiment, client application 112A of participant client system 110A requests to initiate a media-sharing session with participant client system 110B. Although only two participant client systems 110A/B are depicted, other embodiments may include more than two systems. In fact, a practical environment may have many more, perhaps several dozens or hundreds of the aforementioned elements.

To establish a session, client application 112A authenticates with and connects to application server 130 through network 150. Application server 130 may request media streaming system 120 to establish a streaming session with client application 112A of participant client system 110A through network 150. The streaming session is established with participant client system 110A when media is streamed from participant client system 110A to media streaming system 120. Application server 130 may store the newly established session information in active session storage 146.

Client application 112B of participant client system 110B may connect to application server 130 and provide an identifier for the requested media-sharing session. In an embodiment, application server 130 uses the provided identifier to request media streaming system 120 to establish a streaming session denoted by the identifier with client application 112B of participant client system 110B. Such a session identifier may at least in part identify the socket identifier to which participant client system 110A for the media session.

In such an embodiment, participant client system 110B is requesting to connect to the same media session as participant client system 110A. Application server 130 may request media streaming system 120 to share the media sharing session of client application 112A with participant client system 110B and, conversely, to share the media sharing session of client application 112B with participant client system 110A. Thereby, the requested media sharing session is established between client applications 112A/B of participant client systems 110A and 110B, respectively, and managed by application server 130.

The media session is interactively represented by participant UI's 114A/B on client applications 112A/B of participant client system 110A/B, respectively. For example, participant UI 114A may display participant UI controls representing the users of participant client systems 110A/B and a media stream (e.g., a camera video stream) received from client application 112B of participant client system 110B.

In an embodiment, in a media sharing session, the media stream(s) of each client application is identified by the participant identifier. Each media stream may include multiple media tracks, such as audio, video, and data tracks. For example, a media stream of client application 112A may include one or more of the following participant client system 110A's tracks: mono soundtrack, left stereo soundtrack, right stereo soundtrack, camera video track, screen sharing video track, document sharing data, or video track.

In an embodiment, participant client systems 110A/B receive metadata about the media session through a data track of the media session. The metadata about the media session includes the state of the participant's UI (e.g., client application 112B receives the state of participant UI 114A of participant client system 110A) and may be based on the interaction requests received to change the state of the participant's UI. For example, participant client system 110A may receive requests for interaction with participant UI 114A to move the participant UI control (and/or change the background image of participant UI 114A). The participant client system, alternative to or in addition to processing the request, forwards such interaction request data, through the data track, to client application 112B of participant client system 110B (e.g., through application server 130). Conversely, interaction request data from participant client system 110B is forwarded to client application 112A of participant client system 110A. The interaction request data may be caused by receiving interaction requests by participant client systems 110A/B through input devices such as a mouse, keyboard, touchpad, or touchscreen, causing the corresponding rearrangement of UI controls on UI 114A/B, respectively.

DMMSS 100 may include Interaction Generator 160, also referred to as Engagement Generator. Interaction Generator 160 is a computing system coupled to Network 150 that generates interaction data for a media session, in an embodiment. The interaction data is used by Application Server 130 to generate and insert into media session interaction input request UI elements and probing UI element(s) (a question with answer choice or a document to enter input) for participant client systems 110A and 110B to display on participant UIs 114A and 114B. The interaction data may further be used for reconfiguration of participant UI's 114A and 114B to facilitate interaction between participant users (e.g., creation of UI zones, changing backgrounds to relevant images). Interaction Generator may receive a request from Application Server 130 to generate interaction data for participant client systems 110A and 110B. The request may contain context data such as previous interaction result data and/or the description of a new interaction request.

For example, Interaction Generator 160 may generate polling questions for the "Introduction to Computer Science" course to ask such questions to the participant users participating in the media session. The initial context data may be uploaded to Interaction Generator 160 to configure Interaction Generator 160 to provide questions on the particular topic. For each subsequent request, additional context data for Interaction Generator 160 may include a subtopic description (e.g., "conditional statements") and the result data from the previous answers (e.g., 70% accuracy). Interaction Generator 160 may generate the next question based on such a subtopic and historic result data.

In an embodiment, Interaction Generator 160 includes one or more trained machine learning models. A model may receive feature data from the media session and, based on the feature data, generates interaction data.

Interaction Generator 160 provides interaction data to Application Server 130. Application Server 130 modifies the media stream of the media session based on the received interaction data. Application Server 130 may generate and apply UI element(s) or reconfigure the participant UI's based on the interaction data.

Functional Overview

Figure 2:
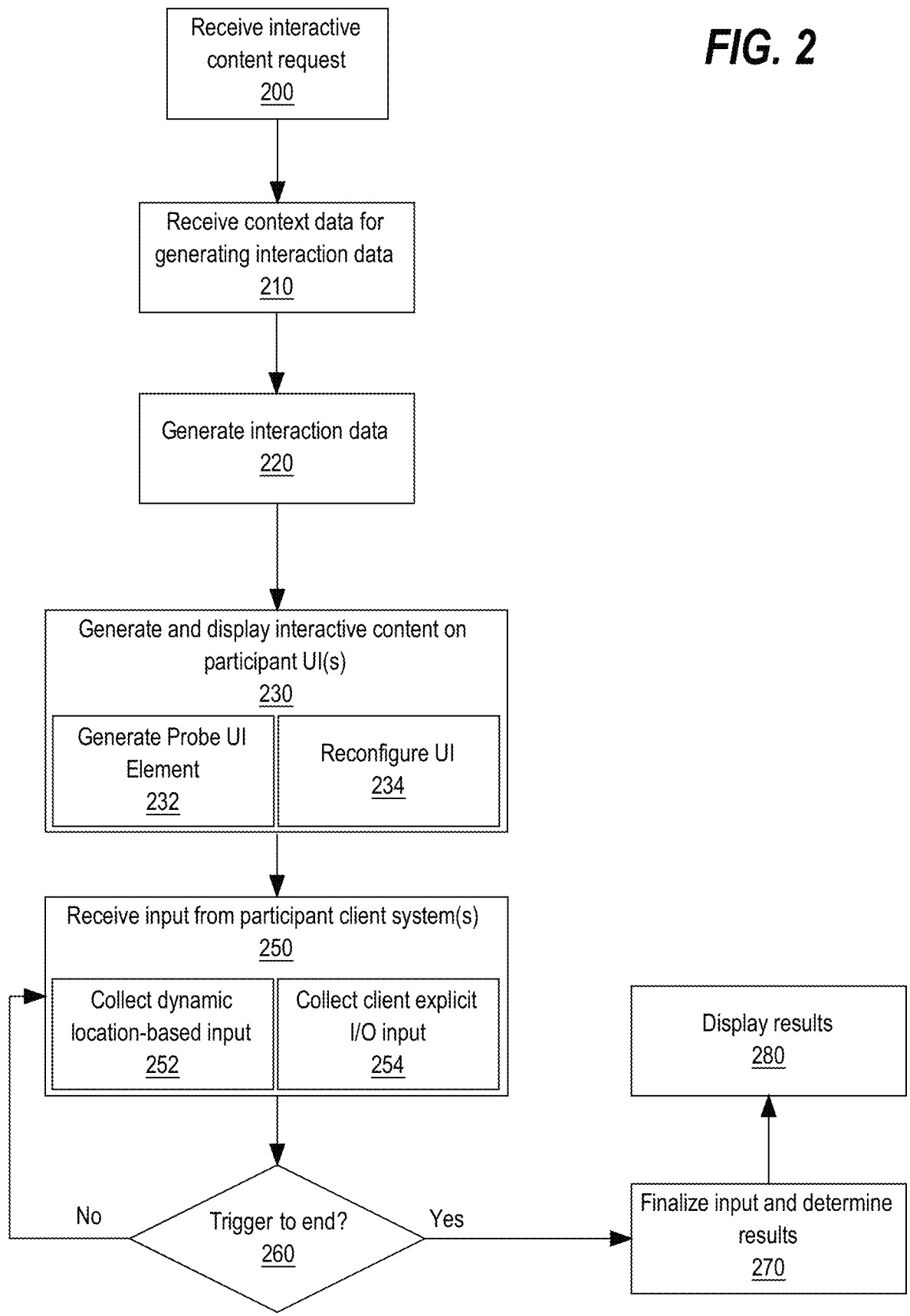
FIG. 2 is a flow diagram that depicts a process for collecting dynamic input for interaction request(s), according to one or more embodiments.

FIG. 2 is a flow diagram that depicts a process for collecting dynamic input and determining results for interaction input request(s), according to one or more embodiments. One or more of the steps, described below may be omitted, repeated, and/or performed in a different order. Accordingly, the specific arrangement of steps shown in FIG. 2 should not be construed as limiting the scope of the invention.

At step 200, DMMSS 100 receives an interactive content request. For example, a participant user of participant client system 110A is presenting a presentation on the conditional "switch" statement of the computer science subject as part of a media session with participant client system 110B. The media stream between participant client systems 110A and 110B shares the presentation and displays on respective participant UIs 114A and 114B. Participant UI 114A may display an option to generate a question poll on the same topic. When the participant user of participant client system 110A selects this option, participant client system 110A receives an interactive input content request.

At step 210, an interactive input content request is received by Interaction Generator 160. The request originating at participating client systems may have been received through data track and/or other network means. In one embodiment, the request may contain context data for generating an interaction request for the participant users of the media session. The context data indicates the subject matter for the interaction request. Additionally or alternatively, the context data may indicate the previous results of the interaction input request(s). Using the previous results, Interaction Generator 160 may generate a more accurate new interaction input request for the participant users.

Continuing with the example of the presentation on the computer science topic of the switch statement, participant client system 110A sends the interactive content request to Application Server 130, which redirects the request to Interaction Generator 160 with context data. The context data indicates that the request is for the subject matter of the computer science switch statement. If the participant users of the media session have previously participated in the poll on the media session, Application Server 130 may provide such information. For example, if Interaction Generator 160 may generate several questions on the switch statements on varying difficulty, Interaction Generator 160 may consider the previous interaction requests' results. Depending on the accuracy of the previous result(s), the new question may be of higher or lower difficulty. For example, if 80% of participant users have previously answered correctly to a question on the "if" conditional statement, then Interaction Generator 160 may select a question of higher difficulty for the "switch" conditional statement.

At step 220, DMMSS 100 generates interaction data responsive to the interaction input request. In an embodiment, Interaction Generator 160 is a machine learning model trained on features of context data (including previous result data, in some embodiments) to select appropriate interaction data. The interaction data may contain a set of instructions and/or description data based on which participant UIs are modified to request dynamic input from participant users.

Automatic Interactive Input Request Generation

In an embodiment, an interactive input request may be generated without any input from a user. Interaction Generator 160 may receive an audio stream (or a portion thereof) of the media session and determine whether the audio data contains or may be used for any interactive input request. Based on the identified/generated interactive input requests, Interaction Generator 160 generates interaction data to generate interactive UI content on participant UI(s), such as probing UI element(s). The steps for generating interactive content may be performed in real-time in response to Interaction Generator 160 processing the audio stream(s) generated from participant client systems 110A/B microphones recording the human speech of the participant(s). Accordingly, as the participant is speaking, Interactive Generator 160 may generate real-time interactive content and display it in the media session for interaction.

Figure 3:
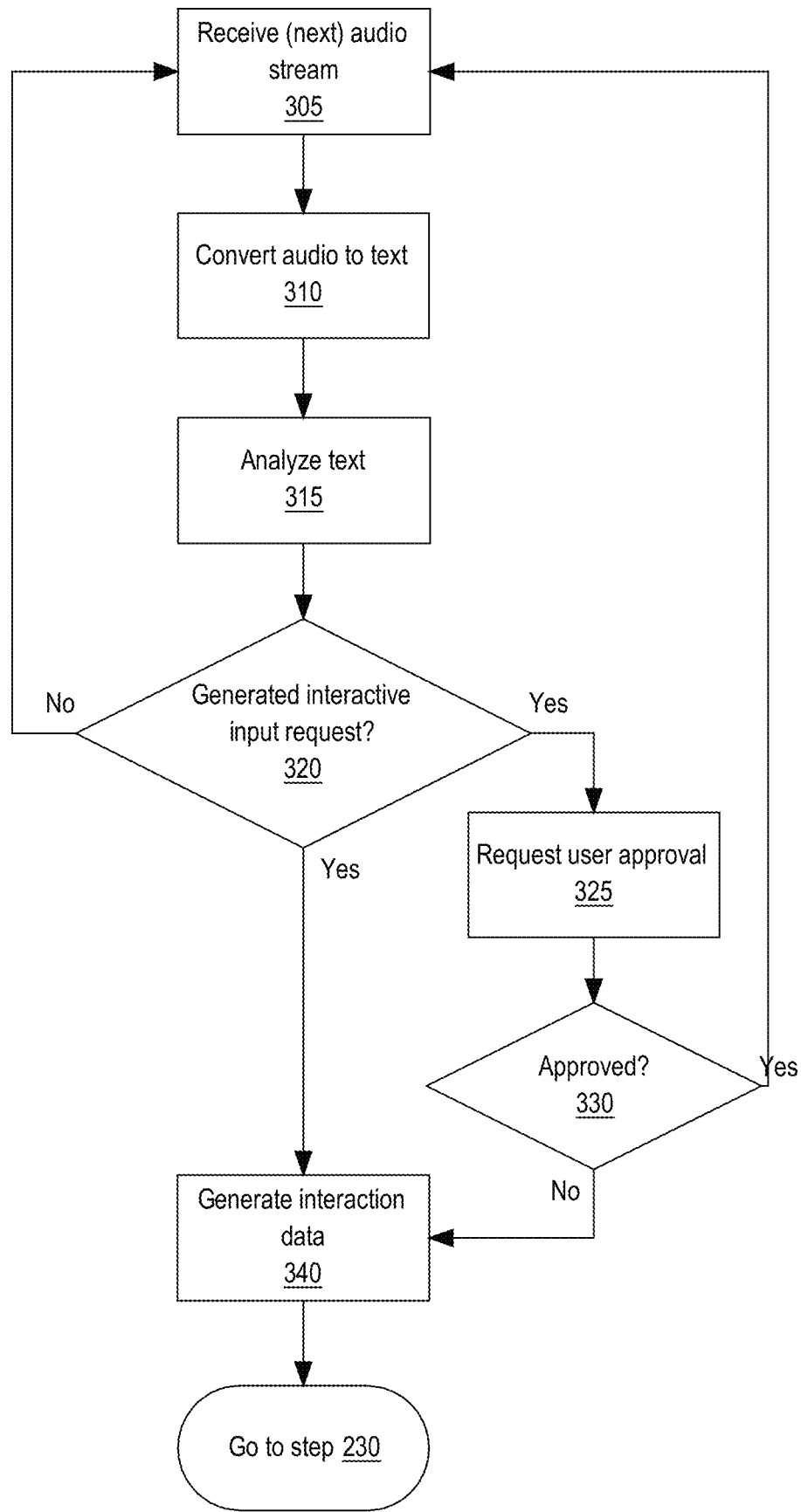
FIG. 3 is a flow diagram that depicts a process of generating an interactive input request for the media session in response to and based on the received participant user media stream, in an embodiment.

FIG. 3 is a flow diagram that depicts a process of generating an interactive input request for the media session in response to and based on the received participant user media stream, in an embodiment. At step 305, Interaction Generator 160 receives a media stream of the media session (or a portion thereof). The media stream may be continuously received as caused by participant client system 110A/B of the media session. For example, when a participant user of participant client system 110A is talking, participant client system 110A captures the human speech and generates an audio stream for the media session for the participant/user of participant client system 110B to receive and recreate.

At step 310, the received portion of the audio stream is converted to the corresponding textual content. For example, the step may include performing ASR (Automatic Speech Recognition) to extract textual content data from the audio stream. Other Natural Language Processing (NLP) based techniques may be used for the conversion to the corresponding textual content. For example, the received portion(s) of the audio stream may contain a computer science lecture and include "let's talk about switch statements" expression, which is converted to the textual form.

At step 315, the generated textual content for a portion of the audio stream is analyzed to generate/identify interactive input requesting textual content, i.e., textual content that requests user input, such as a question and/or answer choices, if appropriate. In one embodiment, Interaction Generator 160 may identify such input requesting textual content in the textual content itself. For example, the textual content may itself include a question and/or answer choices posed by a participant.

Additionally or alternatively, Interaction Generator 160 may include a machine learning model trained to generate input requesting textual content from the textual content. The machine learning model may take as input certain features that may be extracted from the textual content for the generation.

Additionally or alternatively, Interaction Generator 160 may invoke a terminal interface for artificial intelligence engine(s) (e.g., ChatGPT™) with the generated textual content and request input requesting textual content (e.g., a question) to be generated. In response, Interaction Generator 160 receives input requesting textual content from the artificial intelligence engine.

Continuing with the computer science lecture example, at step 315, the textual content "let's talk about switch statements" may be provided to the Interaction Generator 160 to analyze. Interaction Generator 160 may extract features "talk" and "switch statement" and provide such features as input to the machine learning model for generating input requesting textual content. In response, the machine learning model of Interaction Generator 160 may generate input requesting textual content of "Whether switch statement has a default case value?" with answer choices "Yes" or "No".

At step 320, if no input requesting textual content has been identified and/or generated from the textual content at step 315, then the process transitions to step 305, and the next audio stream portion is received for processing. In an embodiment, the next textual content generated from the next audio stream portion may be concatenated with the previous textual content to analyze the combined textual content together at step 315.

Figure 4:
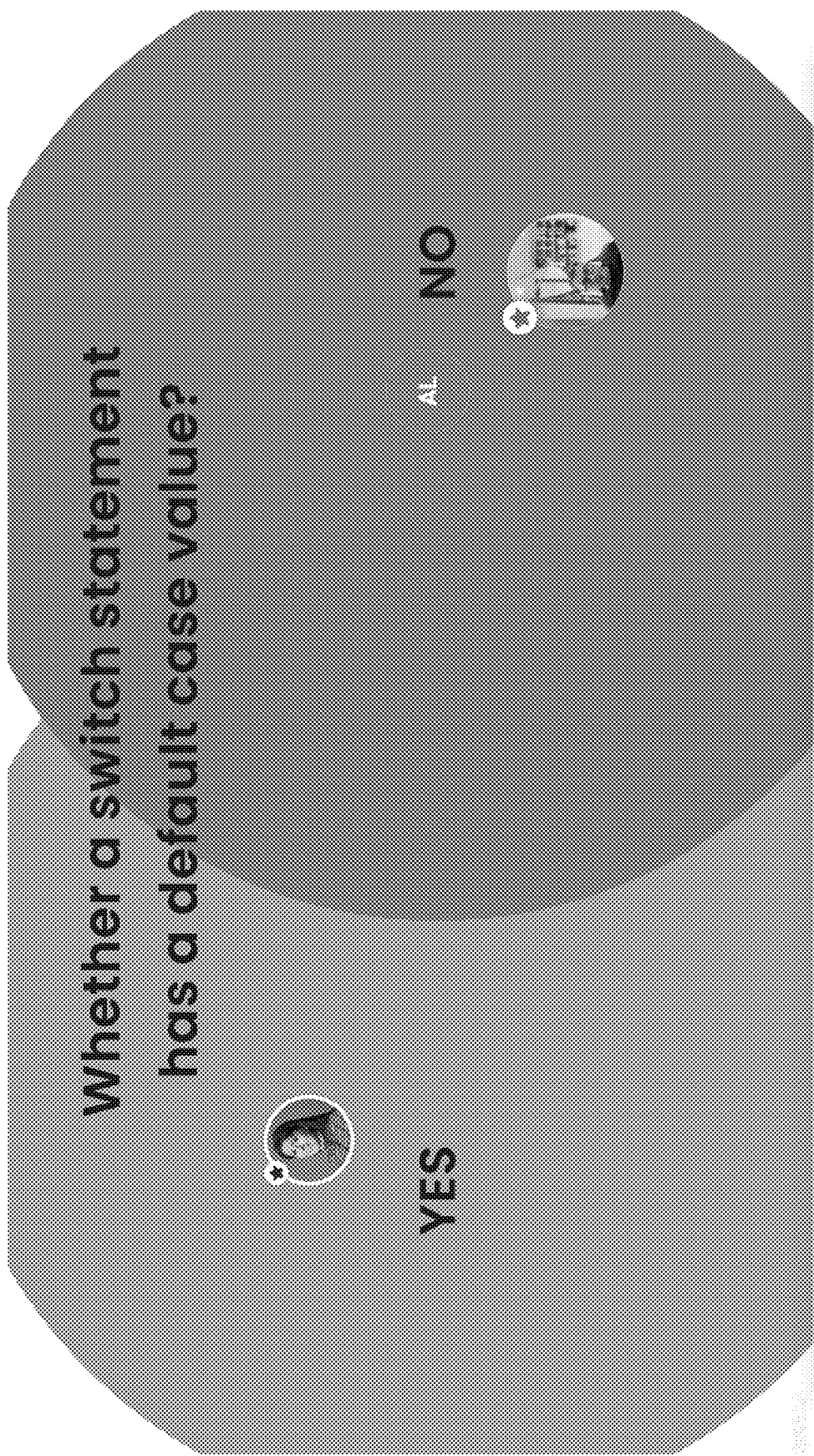
FIG. 4 is an image depicting example probing UI elements, according to one or more embodiments.

In one embodiment, at step 320, if the input requesting textual content is identified/generated, the process transition to step 340 to generate the corresponding interaction data. Interaction Generator 160 generates the interaction data corresponding to the input requesting textual content. For example, for the input requesting textual content of "Whether switch statement has a default case value?" with answer choices "Yes" or "No, Interaction Generator 160 may generate interaction data with instruction(s) to generate a background image with probing UI elements of two intersecting circles each corresponding to an answer choice with the question written across the top. FIG. 4 is an image depicting example probing UI elements, according to one or more embodiments.

In an alternative embodiment, at step 320, if the input requesting textual content is identified/generated, the process proceeds to step 325. At step 325, a participating user in the media session approves whether the input requesting textual content is to be processed for displaying to other participants. In such an embodiment, at step 325, Interaction Generator 160 sends the input requesting textual content to the participating client system(s), thereby requesting input to approve or disapprove. The participating client system may be the participating client system that originated the portion(s) of the audio stream corresponding to this input requesting textual content. At step 330, if the request is not approved, then the process transitions to step 305 to process the next portion of the audio stream. Otherwise, the process transitions to step 340 to generate the corresponding interaction data.

The process then transitions to step 230 of FIG. 2 for generating and displaying interactive input requesting content based on the interaction data.

Processing Interactive Input

Continuing with FIG. 2, at step 230, DMMSS 100 generates interactive input request content and displays the content on participant UIs of participant client systems to request input from participant users. Application Server 130, based on interaction data from Interaction Generator 160, may generate UI elements for participant UIs of participant client systems.

In one embodiment, at step 232, Application Server 130 receives interaction data to generate probing UI elements to be displayed at each of the participant client systems of the media session. For example, Interaction Generator 160 may generate interaction data that indicates the selection of a question with a set of answer choices. The UI elements, in such an embodiment, may include textual UI elements for the question and probing UI elements for the answer choices.

Continuing with the example of conditional logic subject matter in computer science, the Application Server 130 may generate a textual UI element for the question "Whether switch statement has a default case value?" and with probing UI elements for the answer choices "Yes" or "No". Upon the receipts of the UI elements, participant client systems display on the corresponding participant UI's the question with the answer choices as the probing UI elements. Upon display, each participant user may cause its corresponding participant UI control to be moved closer, further from, or covering at least a portion of the probing UI element(s). The movement may be displayed on the participant UI's of the participant client systems participating in the media session.

In another embodiment, the interaction data includes instructions for reconfiguring the participant UI's on the participant client systems at step 234. For example, Interaction Generator 160 may determine that the next question will have textual input, and therefore the interaction data indicates not only the selection of the question but also instructions for presenting textual input at the participant UIs.

Additionally or alternatively, prior result data, used as input to Interaction Generator 160, may include participant users' distribution of accuracy results for the previous input data. In such an embodiment, Interaction Generator 160 may generate interaction data that further provides additional instructions on the configuration of the UI for the interaction input request. For example, Interaction Generator 160 may include interaction data instructions for splitting participant UI's into UI zones. Based on the distribution data, each UI zone is generated to have participant UI controls of participant users with diverse previous accuracy results from the distribution or to have participant UI controls of participant users with similar previous accuracy results for which an appropriate complexity interaction input request is provided. Accordingly, Interaction Generator 160 may instruct to maximize the engagement experience of participant users by appropriately grouping them into UI zones based on their respective previous accuracy results.

Additionally or alternatively, Interaction Generator 160 may determine to split the participant UI's into UI zones based on the question type. If a question is indicated to be for a group discussion, Interaction Generator 160 may request separation of the participant UI's into UI zones.

Continuing with the switch statement computer science subject question generation, Interaction Generator 160 may generate an interaction request to write a switch statement for participant users. Interaction Generator 160 may additionally provide a division for the participant user into groups for performing such an interaction input request. Application Server 130 may instruct participant client systems to create UI zones corresponding to the number of the generated participant user groups and arrange the participant control UIs within the UI zones based on the participant user group division of the participant users. Each UI zone has a document open for any of the participant users to enter textual input in response to the generated interaction request of writing a switch statement. The participant users in the same UI zone may collaborate on their textual input.

At step 250, at each participant client system that has received interaction input request UI elements or has reconfigured UI for input, input is collected from the participant client system. In an embodiment for which probing UI element(s) have been sent to the participant UI client systems to display on the participant UI's, the input from participant users is received when any one or more participant UI controls are moved in relation to the probing UI elements. The coordinates of such movement are received as dynamic location-based input of the corresponding participant user at step 252. The new coordinates of the participant control UI may be sent by the participant client system to Application Server 130 through the data track, thereby recording the movement.

Application Server 130 receives the coordinates (and/or the changes thereof) from the participant client systems in the media session, thereby tracking the movement of each participant user UI control throughout the participant UI. Additionally, Application Server 130 either already has the coordinates of the probing UI elements or similarly receives the coordinates of the probing UI element(s) from participant client systems. In an embodiment, in which the probing UI element(s) on one participant UI differ in location from the same probing UI element(s) on another participant UI, Application Server 130 associates the coordinates of the probing UI element(s) of the participant UI with the corresponding participant user. In such an embodiment, the Application Server 130 may map such probing UI element coordinates to the movement received from the corresponding participant client system for the participant UI control of that participant user.

Continuing with the interaction input request example of the switch statement question having "Yes" and "No" probing UI elements displayed, each participant UI control may be caused to move by the corresponding participant user of the participant client system. The changed coordinates of the participant UI control are communicated to Application Server 130, in one embodiment. Application Server 130 may calculate the distance between each participant UI control and the probing UI element(s) to determine the dynamic location-based input of the respective participant user.

In an embodiment, the input from the participant client systems may be requested as an explicit I/O input to the participant client system at step 254. For example, the participant user has to type on the keyboard the answer to the original input request, thereby providing explicit textual input. Additionally, the participant user may click on UI selectors, thereby providing explicit input to the interaction input request. Similarly, the audio input may also be provided to the interaction input request. Such explicit inputs may be sent by the participant client system to Application Server 130.

At step 260, DMMSS 100 may receive dynamic input to the interaction input request from the participant client systems until a trigger is detected. If the trigger is detected, then the process proceeds to step 270 to finalize the collected input and determine the result(s). The trigger may be based on a timer that is started at the time the interaction input request was initiated. Once the timer expires, and thus, the trigger is detected, the process proceeds to step 270.

In another embodiment, the transition to step 270 is triggered by a separate input received from a participant client system. For example, the same participant user that requested the interaction input request may also request to end the interaction input request. Upon the receipt of an explicit request to end, the process transitions to step 270.

At step 270, the results of the interaction are determined based on the input received. In an embodiment in which the interaction is collected based on the coordinates of the corresponding participant UI control, the distances are calculated based on the distances between participant UI control(s) and the probing UI element.

In one embodiment in which probing UI elements is displayed as a spatial UI element on the participant UI, and any portion of a particular participant UI control overlaps with a particular probing UI element, then it is determined that the participant user of the participant UI control has selected the result associated with the particular probing UI element. For example, if the "Yes" answer choice occupies a particular space (e.g., a larger rectangle) within a participant UI, and the particular participant UI control overlaps with at least a portion of the particular space of the "Yes" answer, then the participant user of the particular participant UI control has selected the "Yes" answer choice, as a result.

In another embodiment, a particular participant UI control may be located at different distances from the various probing UI elements. Each distance with each probing UI element is calculated. One technique is to use an inverse of the distance to calculate the proximity result value for each of the probing UI elements. For example, the particular participant UI control is 150 pixels away from the center of the "Yes" probing UI element and 200 pixels away from the "No" probing UI element. DMMSS 100 may calculate that the participant user of the participant UI control has the proximity of 1/150 for "Yes" and the proximity of 1/200 for "No". Accordingly, the determined result would include both results. Another technique is to select the closest distance probing UI element as the particular probing UI element selected by the particular user of the particular participant UI control. For example, using such techniques, the particular participant UI control would have selected "Yes" as the result of the interaction.

In an embodiment, explicit I/O inputs are processed by DMMSS 100 in response to interaction input requests. In one embodiment, a machine learning model trained with results of similar interactions receives the explicit I/O data of the interaction as input and produces the appropriate result. In another embodiment in which the input data is computer code, DMMSS 100 may include a code evaluator to evaluate the submitted computer code and produce the appropriate results.

At step 280, the results of the interaction input request may be displayed on one or more participant UI's of the participant client systems.

Software Overview

Figure 5:
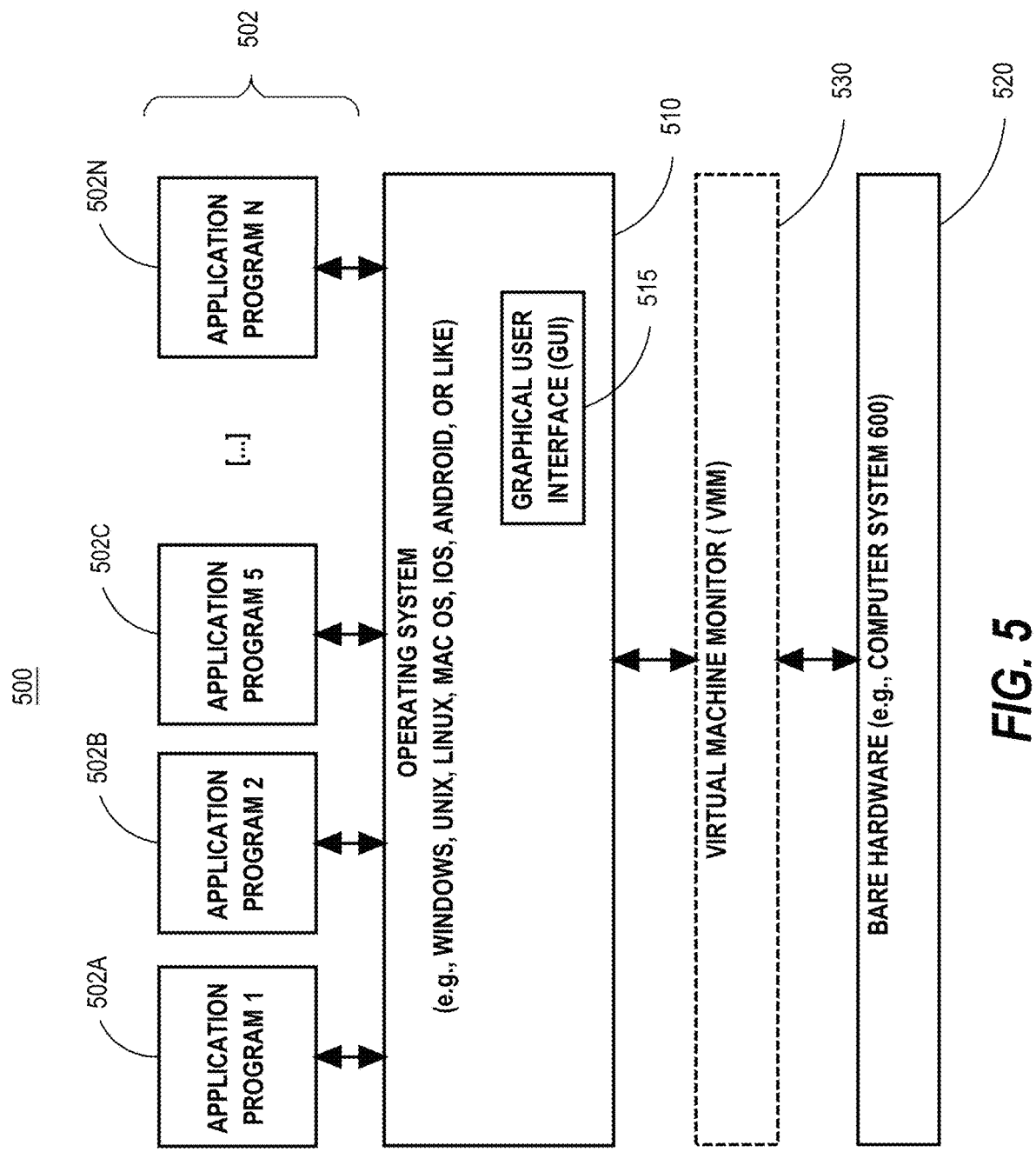
FIG. 5 is a block diagram of a basic software system, in one or more embodiments.
Figure 6:
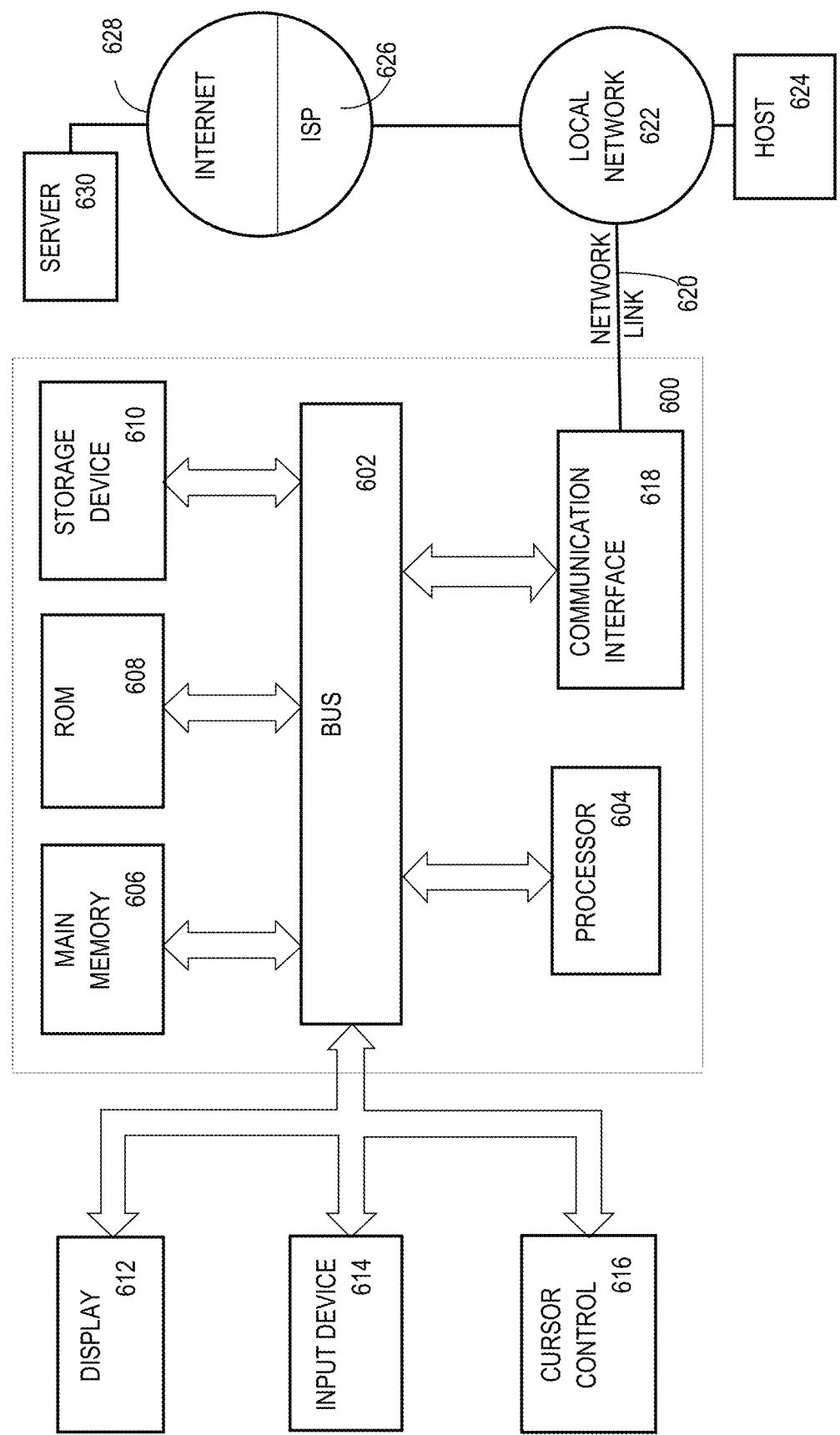
FIG. 6 is a block diagram that illustrates a computer system upon which an embodiment of the invention may be implemented.

FIG. 5 is a block diagram of a basic software system 500 that may be employed for controlling the operation of computing system 600 of FIG. 6. Software system 500 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or another online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random access memory (RAM) or another dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read-only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal, and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626, in turn, provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    receiving, by an application server, a first media stream originating from a first client computer system associated with a first user and a second media stream originating from a second client computer system associated with a second user in a media session;
    receiving, by the application server, a request to generate an interactive input request related to a particular portion of a media stream of the media session;
    generating and sending, by the application server, one or more probing user interface (UI) elements that represent the interactive input request on a first user interface (UI) of the first client computer system and a second user interface (UI) of the second client computer system of the media session to the first client computer system and the second client computer system;
    wherein the sending of the one or more probing UI elements causes to simultaneously display, at least, the one or more probing UI elements, a first participant UI control uniquely identifying the first user of the media session and a second participant UI control uniquely identifying the second user of the media session on both the first UI of the first client computer system and the second UI of the second client computer system;
    receiving, by the application server and from the first client computer system and the second client computer system, first one or more coordinates of location of the first participant UI control and second one or more coordinates of location of the second participant UI control, wherein the first one or more coordinates and the second one or more coordinates are respective coordinates of the first participant UI control on the first UI of the first client computer system and of the second participant UI control on the second UI of the second client computer system of the media session;
    based at least in part on one or more particular coordinates of location of the one or more probing UI elements and the application server receiving the first one or more coordinates of location of the first participant UI control and the second one or more coordinates of location of the second participant UI control determining, by the application server, first response data of the first user to the interactive input request and second response data of the second user to the interactive input request;
    wherein the determining of the first response data and the second response data is performed without receiving any interaction data from the first client computer system and the second client computer system other than the first one or more coordinates and the second one or more coordinates.

2. The method of claim 1, wherein each of the one or more probing UI elements, representing the interactive input request, corresponds to an answer choice of a plurality of answer choices of the interactive input request.

3. The method of claim 1, further comprising:
    before generating the one or more probing UI elements representing the interactive input request on the first UI and the second UI, receiving an interactive content request for generating the interactive input request for the first user and the second user of the media session, wherein the interactive content request, at least in part, includes context data for generating interaction data;
    based at least in part on the context data, generating the interaction data for generating the one or more probing UI elements.

4. The method of claim 1, wherein receiving a request to generate the interactive input request comprises:
    receiving audio data from the first client computer system in the media session;
    converting the audio data to textual content;
    determining that the textual content contains the interactive input request;
    based on determining that the textual content contains the interactive input request, generating interaction data for generating the one or more probing UI elements.

5. The method of claim 1, further comprising:
    generating interaction data by one or more machine learning models (ML models) based at least in part on context data of the media session.

6. The method of claim 5, wherein the context data, at least in part, contains previous results of at least one previous interaction input request.

7. The method of claim 1, further comprising:
    determining that the first UI control covers a portion of a probing UI element of the one or more probing UI elements;
    based at least in part on determining that the first UI control covers the portion of the probing UI element, determining the first response data for the interactive input request.

8. The method of claim 1, further comprising:
    determining that the first one or more coordinates of location of the first UI control is different from one or more coordinates of locations of the one or more probing UI elements;
    determining proximities between the first UI control and the one or more probing UI elements;
    based, at least in part, on determining the proximities between the first UI control and the one or more probing UI elements, calculating a confidence level;
    wherein the confidence level represents a relative confidence level of the first user of the media session for a particular response to the interactive input request;
    based, at least in part, on the confidence level, determining the first response data for the interactive input request.

9. The method of claim 1, further comprising:
receiving the first response data of the first user and the second response data of the second user for the interactive input request;
based, at least in part, on the first response data of the first user and the second response data of the second user for the interactive input request, determining result of the interactive input request;
sending the result of the interactive input request to the first client computer system and the second client computer system of the media session, and thereby, causing to display the result of the interactive input request on the first UI of the first client computer system and the second UI of the second client computer system of the media session.

10. A system comprising one or more processors and one or more storage media storing one or more computer programs for execution by the one or more processors, the one or more computer programs configured to perform a method comprising:
receiving, by an application server, a first media stream originating from a first client computer system associated with a first user and a second media stream originating from a second client computer system associated with a second user in a media session;
receiving, by the application server, a request to generate an interactive input request related to a particular portion of a media stream of the media session;
generating and sending, by the application server, one or more probing user interface (UI) elements that represent the interactive input request on a first user interface (UI) of the first client computer system and a second user interface (UI) of the second client computer system of the media session to the first client computer system and the second client computer system;
wherein the sending of the one or more probing UI elements causes to simultaneously display, at least, the one or more probing UI elements, a first participant UI control uniquely identifying the first user of the media session and a second participant UI control uniquely identifying the second user of the media session on both the first UI of the first client computer system and the second UI of the second client computer system;
receiving, by the application server and from the first client computer system and the second client computer system, first one or more coordinates of location of the first participant UI control and second one or more coordinates of location of the second participant UI control, wherein the first one or more coordinates and the second one or more coordinates are respective coordinates of the first participant UI control on the first UI of the first client computer system and of the second participant UI control on the second UI of the second client computer system of the media session;
based at least in part on one or more particular coordinates of location of the one or more probing UI elements and the application server receiving the first one or more coordinates of location of the first participant UI control and the second one or more coordinates of location of the second participant UI control, determining, by the application server, first response data of the first user to the interactive input request and second response data of the second user to the interactive input request;
wherein the determining of the first response data and the second response data is performed without receiving any interaction data from the first client computer system and the second client computer system other than the first one or more coordinates and the second one or more coordinates.

11. The system of claim 10, wherein each of the one or more probing UI elements, representing the interactive input request, corresponds to an answer choice of a plurality of answer choices of the interactive input request.

12. The system of claim 10, wherein the method further comprises:
before generating the one or more probing UI elements representing the interactive input request on the first UI and the second UI, receiving an interactive content request for generating the interactive input request for the first user and the second user of the media session, wherein the interactive content request, at least in part, includes context data for generating interaction data;
based at least in part on the context data, generating the interaction data for generating the one or more probing UI elements.

13. The system of claim 10, wherein receiving a request to generate the interactive input request comprises:
receiving audio data from the first client computer system in the media session;
converting the audio data to textual content;
determining that the textual content contains the interactive input request;
based on determining that the textual content contains the interactive input request, generating interaction data for generating the one or more probing UI elements.

14. The system of claim 10, wherein the method further comprises:
generating interaction data by one or more machine learning models (ML models) based at least in part on context data of the media session.

15. The system of claim 14, wherein the context data, at least in part, contains previous results of at least one previous interaction input request.

16. The system of claim 10, wherein the method further comprises:
determining that the first UI control covers a portion of a probing UI element of the one or more probing UI elements;
based at least in part on determining that the first UI control covers the portion of the probing UI element, determining the first response data for the interactive input request.

17. The system of claim 10, wherein the method further comprises:
determining that the first one or more coordinates of location of the first UI control is different from one or more coordinates of locations of the one or more probing UI elements;
determining proximities between the first UI control and the one or more probing UI elements;
based, at least in part, on determining the proximities between the first UI control and the one or more probing UI elements, calculating a confidence level;
wherein the confidence level represents a relative confidence level of the first user of the media session for a particular response to the interactive input request;
based, at least in part, on the confidence level, determining the first response data for the interactive input request.

18. The system of claim 10, wherein the method further comprises:

receiving the first response data of the first user and the second response data of the second user for the interactive input request;

based, at least in part, on the first response data of the first user and the second response data of the second user for the interactive input request, determining result of the interactive input request;

sending the result of the interactive input request to the first client computer system and the second client computer system of the media session, and thereby, causing to display the result of the interactive input request on the first UI of the first client computer system and the second UI of the second client computer system of the media session.

* * * * *